(12) United States Patent
Tanaka

(10) Patent No.: US 7,123,984 B2
(45) Date of Patent: Oct. 17, 2006

(54) THREADING CONTROL METHOD AND APPARATUS THEREFOR

(75) Inventor: Takahisa Tanaka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/531,474

(22) PCT Filed: Feb. 6, 2003

(86) PCT No.: PCT/JP03/01245

§ 371 (c)(1), (2), (4) Date: Apr. 15, 2005

(87) PCT Pub. No.: WO2004/069459

PCT Pub. Date: Aug. 19, 2004

(65) Prior Publication Data

US 2006/0047357 A1  Mar. 2, 2006

(51) Int. Cl.
G06F 19/00 (2006.01)

(52) U.S. Cl. .................................... 700/193

(58) Field of Classification Search ............... 700/173, 700/176, 188, 191, 192, 193
See application file for complete search history.

(56) References Cited

U.S. PATENT DOCUMENTS

| | | | | |
|---|---|---|---|---|
| 4,053,819 A | * | 10/1977 | Matsumoto | 318/636 |
| 4,079,235 A | * | 3/1978 | Froyd et al. | 700/169 |
| 4,318,646 A | * | 3/1982 | Watanabe | 408/6 |
| 4,386,407 A | * | 5/1983 | Hungerford | 700/188 |
| 4,514,814 A | * | 4/1985 | Evans | 700/169 |
| 4,620,347 A | * | 11/1986 | Stark et al. | 483/56 |
| 4,789,943 A | | 12/1988 | Yamanaka et al. | |
| 4,813,821 A | * | 3/1989 | Hirota | 408/9 |
| 4,879,660 A | * | 11/1989 | Asakura et al. | 700/173 |
| 5,404,308 A | * | 4/1995 | Kajiyama | 700/188 |
| 5,517,097 A | * | 5/1996 | Hayashida | 318/568.22 |
| 5,538,369 A | * | 7/1996 | Okuda | 408/3 |
| 5,832,590 A | * | 11/1998 | Wuerthner | 29/563 |

FOREIGN PATENT DOCUMENTS

| | | |
|---|---|---|
| JP | 59187422 | 10/1984 |
| JP | 62094222 | 4/1987 |
| JP | 05046236 | 2/1993 |

\* cited by examiner

Primary Examiner—Leo Picard
Assistant Examiner—Chad Rapp
(74) Attorney, Agent, or Firm—Sughrue Mion, PLLC

(57) ABSTRACT

A threading control method and apparatus therefor is provided, in which, when carrying out thread-cut machining operations several times at one position, synchronized with main-spindle rotation and controlling movement of a threading spindle, deviations in thread grooves are prevented without correcting programmed commands, machining accuracy is improved, and tool life extended.

When a main-spindle single-rotation reference signal and a main-spindle position counter are input to the numerical control apparatus, the present main-spindle position is computed by a main-spindle position computing means 103, the difference between the main-spindle single-rotation reference signal and control cycles is obtained, as a correction amount 108, from the computed main-spindle position, by a main-spindle position-correcting means 104 and a correction is done. A threading-spindle interpolation starting detection means 105 monitors whether the main-spindle single-rotation reference signal and the control cycles are synchronous, and when synchronous, interpolation for the threading spindle is started by interpolation means 106 for each spindle.

10 Claims, 8 Drawing Sheets

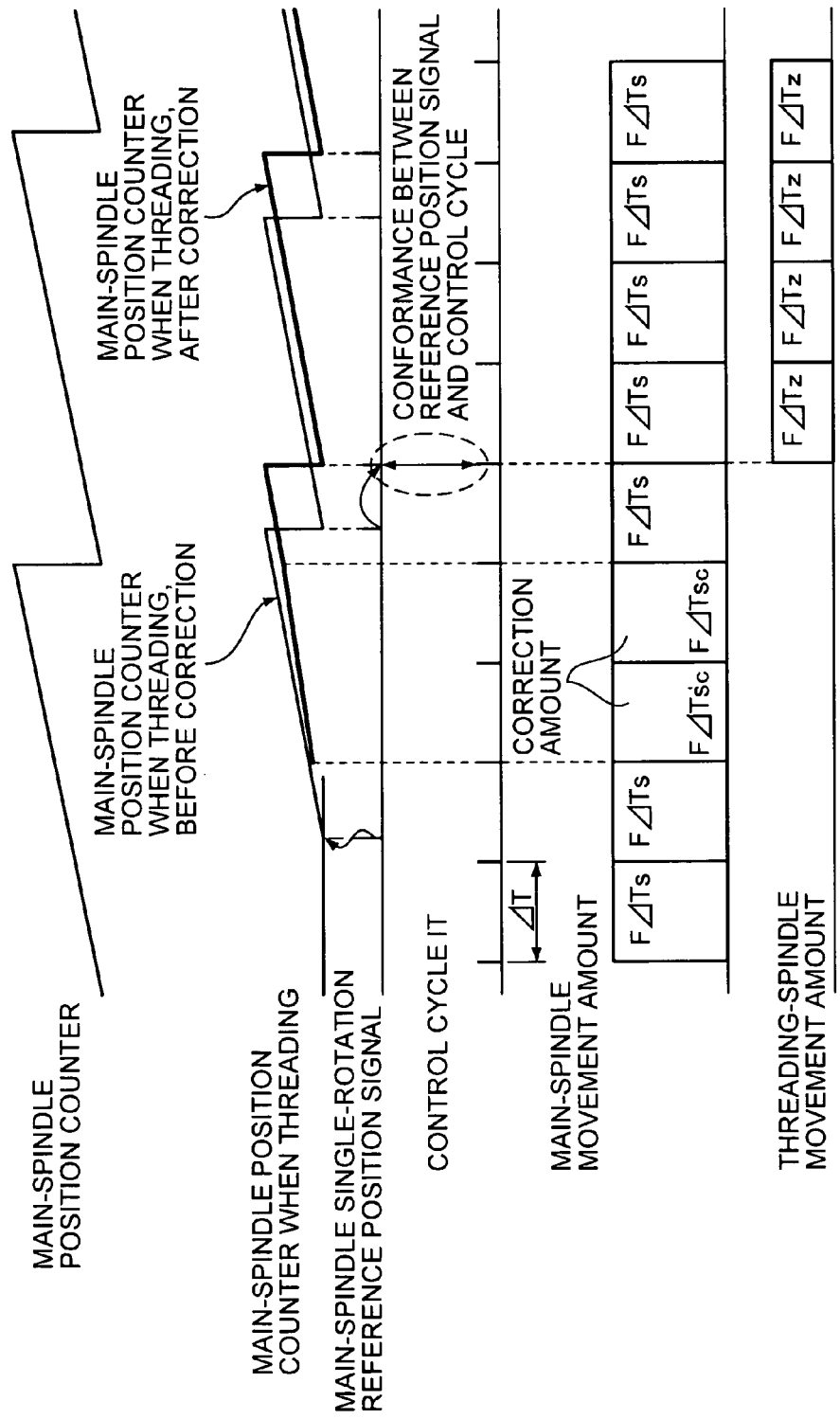

FIG. 3

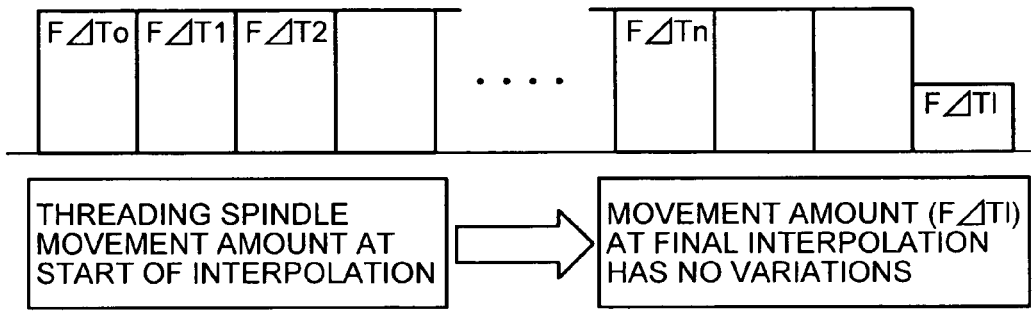

F$\Delta$Ts : MAIN-SPINDLE MOVEMENT AMOUNT PER CONTROL CYCLE
F$\Delta$Tsc: POST-CORRECTION MAIN-SPINDLE MOVEMENT AMOUNT PER CONTROL CYCLE
F$\Delta$Tz: THREADING-SPINDLE MOVEMENT AMOUNT PER CONTROL CYCLE
F$\Delta$To: THREADING-SPINDLE MOVEMENT AMOUNT AT FIRST INTERPOLATION
F$\Delta$Tn: THREADING-SPINDLE MOVEMENT AMOUNT AT SECOND AND SUBSEQUENT INTERPOLATIONS
F$\Delta$Tl: THREADING-SPINDLE MOVEMENT AMOUNT AT FINAL INTERPOLATION
$\Delta$T: CONTROL CYCLE

THREADING CONTROL METHOD AND APPARATUS THEREFOR

TECHNICAL FIELD

The present invention relates to a threading control method and an apparatus therefor.

BACKGROUND ART

In conventional numerical control apparatuses (in what follows, numerical control is referred to as NC), a main spindle holding a workpiece is given a constant rotation, the amount of rotation of the main spindle is detected by an encoder attached to the main spindle, threading-spindle movement amount proportional to a prescribed thread lead is computed, and movement control is carried out.

Further, when a thread is made in the workpiece, in general, thread-cut machining is repeated several times while varying tool cutting amount, and this controls starting of interpolation for the threading spindle, with a main-spindle single-rotation reference-position signal as reference. However, since the main-spindle single-rotation reference position signal and NC control cycle IT are not synchronous, in cases where two or more machining repetitions are carried out for the same thread, there have been occurrences of variations in the actual cutting position.

Further, since there are variations in the cut-finish path near the end of the threading, due to variations produced at start of threading, an incomplete thread portion at the thread ending becomes long, and it is necessary to take into account the incomplete thread length including the variation portion. Further, due to fluctuations in cutting load due to variations in the cut-finish path close to the end point of the threading, thread accuracy near the end point degrades, and due to the fluctuations in this cutting load, there have been cases where tool life has been shortened.

Using FIG. 6 to FIG. 8, a detailed description of these issues is as follows.

As illustrated in FIG. 8, thread-cut machining is implemented by giving the workpiece, attached to the main spindle, a constant rotation, and by moving a cutting tool from a threading starting position, set at a fixed prescribed position, in the direction of the threading spindle.

In conventional threading control, as illustrated in FIG. 6, the main-spindle position, when threading, is obtained by a main-spindle position counter in which, when threading, a counting operation is started with the main-spindle single-rotation reference position signal, which is output by the encoder installed on the main spindle every time the main spindle makes one rotation, as a trigger. Further, when threading, regarding this main-spindle position counter, output is generated by the main-spindle position counter that is used for control of each rotation, the count is cleared at a prescribed count number, and the count restarted. The threading control controls the starting of threading-spindle interpolation based on the main-spindle single-rotation reference position signal; at this time, the amount the threading spindle moves is computed in the interpolation processing of the NC apparatus, executed at a constant cyclic interval (for example, 10 msec), and the amount the threading spindle moves at the first interpolation is:

$$F\Delta To = (\Delta Po \div P) \times L$$

($\Delta Po$: first-time main-spindle position variation amount [number of pulses],
$P$: number of pulses per main-spindle single rotation,
$L$: thread lead Here, since the main-spindle rotation cycle and the control cycle IT are asynchronous, variations occur in the value of $\Delta Po$ and also in the threading-spindle movement amount, $F\Delta To$, at the first interpolation. These variations become the variations at the start of threading, and finally, as illustrated in FIG. 8, become the variations at the start of cut-finishing, so that the cut-finish path is no longer constant. FIG. 7 illustrates how the threading-spindle movement amount, $F\Delta T_1$, at the final interpolation varies when the threading-spindle movement amount, $F\Delta To$, at the first interpolation varies.

Technology for solving these types of problems is disclosed in Japanese Laid-Open Patent Publication 1993-46236, consisting of altering the control cycle for a servo, so as to have synchronicity with the main-spindle single-rotation reference signal However, since the above technology requires special hardware (H/W) apparatus in order to change the control cycle just before the thread-cut machining, there are disadvantages in that the H/W configuration becomes complicated.

DISCLOSURE OF INVENTION

In the light of these types of issues, the present invention has as an object the provision of a threading control method and apparatus therefor, that can perform thread-cut machining with good accuracy, without the occurrence of variations at the start of threading, even in cases where thread-cut machining is repeated several times while altering tool cutting amount, without changing the conventional H/W.

In order to solve the conventional problems described above, the threading control method related to the present invention comprises a step of computing the present position of a main spindle, a step of generating a main-spindle position correction amount in order to make a single-rotation reference signal of the main spindle synchronous with a control cycle, based on the single-rotation reference signal of the main spindle and the computed present position of the main spindle, and of correcting, by this main-spindle position correction amount, the position of the main spindle so that the single-rotation reference signal of the main spindle and the control cycle are synchronized, a step of confirming the synchronization of the control cycle and the main-spindle single-rotation reference signal whose position has been corrected, and a step of outputting a command to the threading spindle when the main-spindle single-rotation reference signal and the control cycle are synchronized.

As a result it is possible, without changing the conventional H/W, to make the control cycles conform with the rotation cycle of the main spindle by correcting the position of the main spindle, from the present main-spindle position counter value and the main-spindle single-rotation reference position. In this way, even in cases where the thread-cut machining is repeated several times while changing the tool cutting amount, since variations are not produced when starting threading and close to the end point of the threading, the thread-cut machining accuracy is improved. Since the threading end point path is constant, changes in cutting load are reduced and the tool life is extended.

Furthermore, the threading control method of this invention is such that the position of the main spindle is corrected in a direction in which the rotational frequency of the main spindle diminishes.

Thus, the correction can be done below the maximum rotational frequency of the main spindle, so that the thread-cut machining can be carried out safely.

Further, the threading control method of this invention is such that, when the deviation between the single-rotation reference signal of the main spindle and the control cycle is below a prescribed value, and the rotational frequency of the main spindle is below a designated value, the position of the main spindle is corrected in the direction in which the rotational frequency of the main spindle increases.

As a result, the time necessary for correction is reduced and the cycle time is shortened.

Furthermore, the threading control method of this invention is such that the main-spindle position correction amount is computed to be below the maximum correction amount of the main spindle, so that the variations in rotation of the main spindle are within predetermined variations.

As a result, main-spindle speed variations can be restrained and the occurrence of inaccuracies and main-spindle alarms can be restrained.

Additionally, the threading control method of this invention is such that the main-spindle position correction amount includes the threading starting angle.

As a result, it is possible to start thread-cut machining from an arbitrary angle.

A threading control apparatus related to the present invention comprises a main-spindle position computing means for computing the present position of the main spindle, a main-spindle position correcting means for generating a main-spindle position correction amount in order to make a single-rotation reference signal of the main spindle synchronous with a control cycle, based on the single-rotation reference signal of the main spindle and the main-spindle present position computed by the main-spindle position computation means, and for correcting, by this main-spindle position correction amount, the position of the main spindle so that the single-rotation reference signal of the main spindle and the control cycle are synchronized, a threading-spindle interpolation start detection means for confirming the synchronization of the control cycle and the main-spindle single-rotation reference signal whose position has been corrected, and an interpolation means for each spindle for outputting a command to the threading spindle when the main-spindle single-rotation reference signal and the control cycle are synchronized.

As a result it is possible, without changing the conventional H/W, to make the control cycles conform with the rotational cycle of the main spindle, by correcting the position of the main spindle from the present main-spindle position counter value and the main-spindle single-rotation reference position.

In this way, even in cases where the thread-cut machining is repeated several times while changing the tool cutting amount, since variations are not produced when starting threading and close to the end point of the threading, the thread-cut machining accuracy is improved. Since the threading end point path is constant, changes in cutting load are reduced and the tool life is extended.

Furthermore, the threading control apparatus of this invention is such that the main-spindle position correcting means corrects the position of the main spindle in a direction in which the rotational frequency of the main spindle diminishes.

Thus, correction can be done below the maximum rotational frequency of the main spindle, so that thread-cut machining can be carried our safely.

Further, the threading control apparatus of this invention is such that, when the deviation between the single-rotation reference signal of the main spindle and the control cycle is below a prescribed value, and the rotational frequency of the main spindle is below a designated value, the main-spindle position correcting means corrects the position of the main spindle in the direction in which the rotational frequency of the main spindle increases.

As a result, the time necessary for correction is reduced and the cycle time is shortened.

Furthermore, the threading control apparatus of this invention is such that the main-spindle position correcting means performs computation with the correction amount for the main-spindle position below the maximum correction amount, so that the main-spindle rotational variations are within predetermined variations.

As a result, the main-spindle speed variations can be restrained and the occurrence of inaccuracies and main-spindle alarms can be restrained.

Additionally, the numerical control apparatus of this invention is such that the main-spindle position correction amount computed by the main-spindle position correcting means includes the threading starting angle.

As a result, it is possible to start thread-cut machining from an arbitrary angle.

BRIEF DESCRIPTION OF DRAWINGS

FIG. 2 is an explanatory diagram for threading control related to Embodiment 1 of the present invention;

FIG. 3 is a diagram explaining an effect related to Embodiment 1 of

BEST MODE FOR CARRYING OUT THE INVENTION

Embodiment 1

Embodiment 1 of the present invention is described below, referring to FIGS. 1 through 5.

In Embodiment 1 related to the present invention, in order to make main-spindle rotation cycle be in conformance with control cycle IT, as illustrated in FIG. 2, main-spindle rotation speed is slowed down for a moment so as to correct the deviance between the control cycle IT and a main-spindle single-rotation reference position signal, and the main-spindle rotation cycle is made synchronous with the control cycle IT. The arrangement is such that, after it has been confirmed that the main-spindle single-rotation reference position signal and the control cycle IT are in conformance, movement amount for the threading spindle is generated. In this way, as illustrated in FIG. 3, even if the thread-cut machining is repeated several times, the spindle movement amount at threading start and at threading completion is always constant, and variations in movement amount in the first interpolation at threading start are eliminated.

Details for performing the control described above are now explained.

Figure 1:
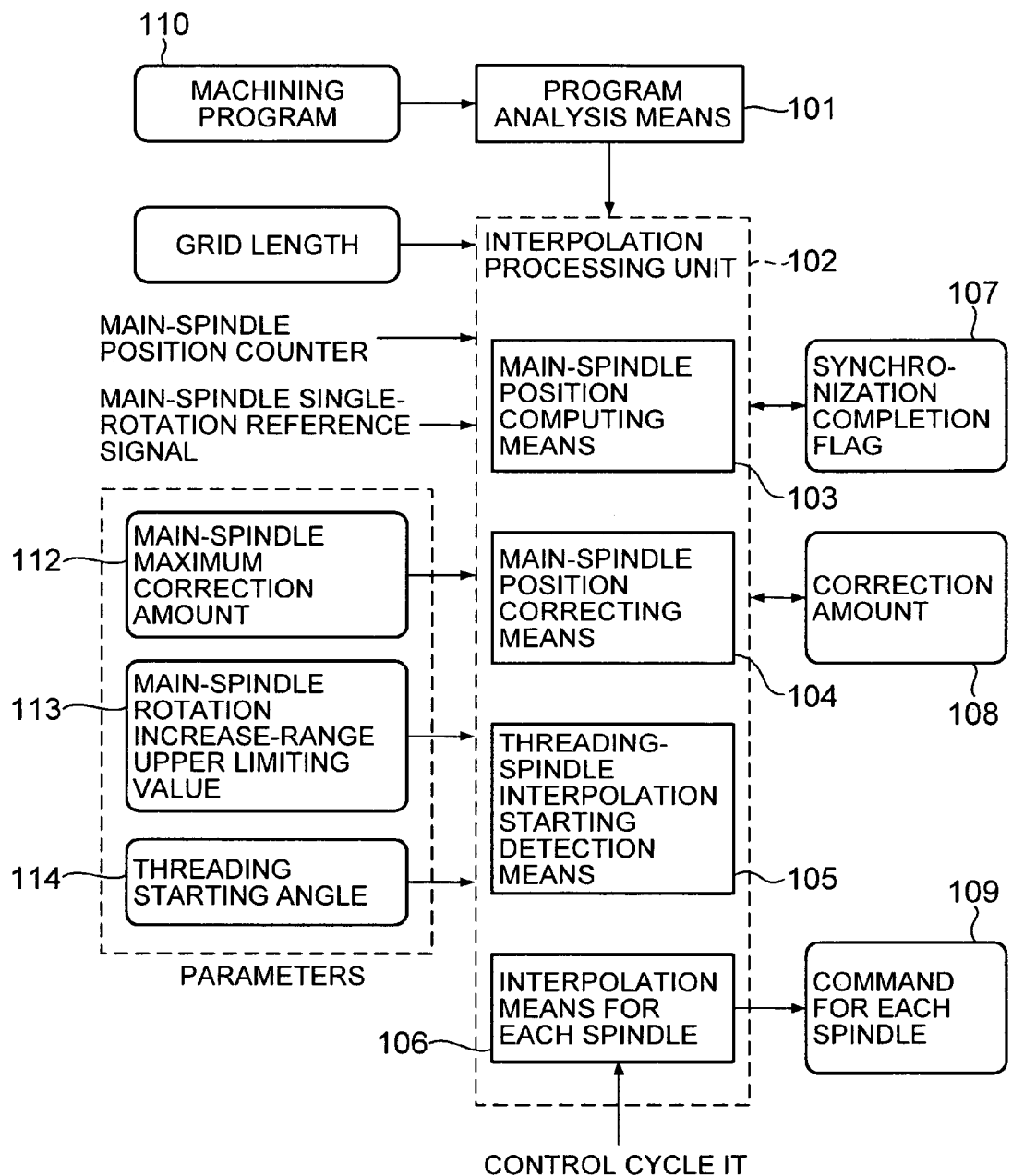
FIG. 1 is a block diagram illustrating one configuration example of an NC apparatus related to Embodiment 1 of the present invention.

FIG. 1 is a block diagram illustrating an overall configuration for an NC apparatus related to Embodiment 1 of the present invention.

In FIG. 1, one block at a time is read in by a program analysis means 101 from a machining program 110 housed in a memory, and movement amount, speed and the like are read out together with a G command. Based on information analyzed in this program analysis means 101, in an interpolation processing unit 102 where processing takes place at the fixed control cycle IT (for example, 10 msec), the movement amount is output per unit of time (for example 10 msec) for each spindle (the main spindle for rotating the workpiece and a spindle for moving the threading tool.)

The main-spindle single-rotation reference signal and the main-spindle position counter when threading (the arrangement being made by the main-spindle position counter used for forwarding-control at each rotation, the main spindle being given a single rotation once, and a counting operation being started with the main-spindle single-rotation reference position signal outputted by an encoder installed on the main spindle, as a trigger, the count being cleared every predetermined number of counts and the count being restarted again) are input in the interpolation processing unit 102 where processing takes place at a fixed cycle interval, the present position (angle) of the main spindle is computed by a main-spindle position computing means 103, from this computed main-spindle position, the deviation between the main-spindle single-rotation reference signal and the control cycle is obtained, by the main-spindle position-correcting means 104, as a correction amount 108, and this correction amount 108 is split up so as to be accommodated within the main-spindle maximum correction amount 112, and is outputted.

The main-spindle maximum correction amount 112 is set, considering that if the correction amount is output to the main-spindle once, the rotational speed variation of the main spindle becomes large and an alarm occurs, and, with the maximum possible correction value per control cycle unit, is equivalent to a main-spindle movement amount FΔTs (see FIG. 2) per control cycle unit.

A threading-spindle interpolation starting detection means 105, monitors whether the main-spindle single-rotation reference signal and the control cycle are synchronous, and in cases of synchronicity, interpolation for the threading spindle is carried out by an interpolation means 106 for each spindle.

By adding a threading starting angle 114 to the correction amount 108 obtained by the main-spindle position-correcting means 104, it is possible to shift the threading starting position.

However, the shifting of the threading starting position is for cases such as when a reformed thread is being made (a thread in which previously cut thread is re-threaded for use); in cases where new threading is carried out in a workpiece that has not been threaded, shifting of this threading starting position is normally not done.

Figure 5:
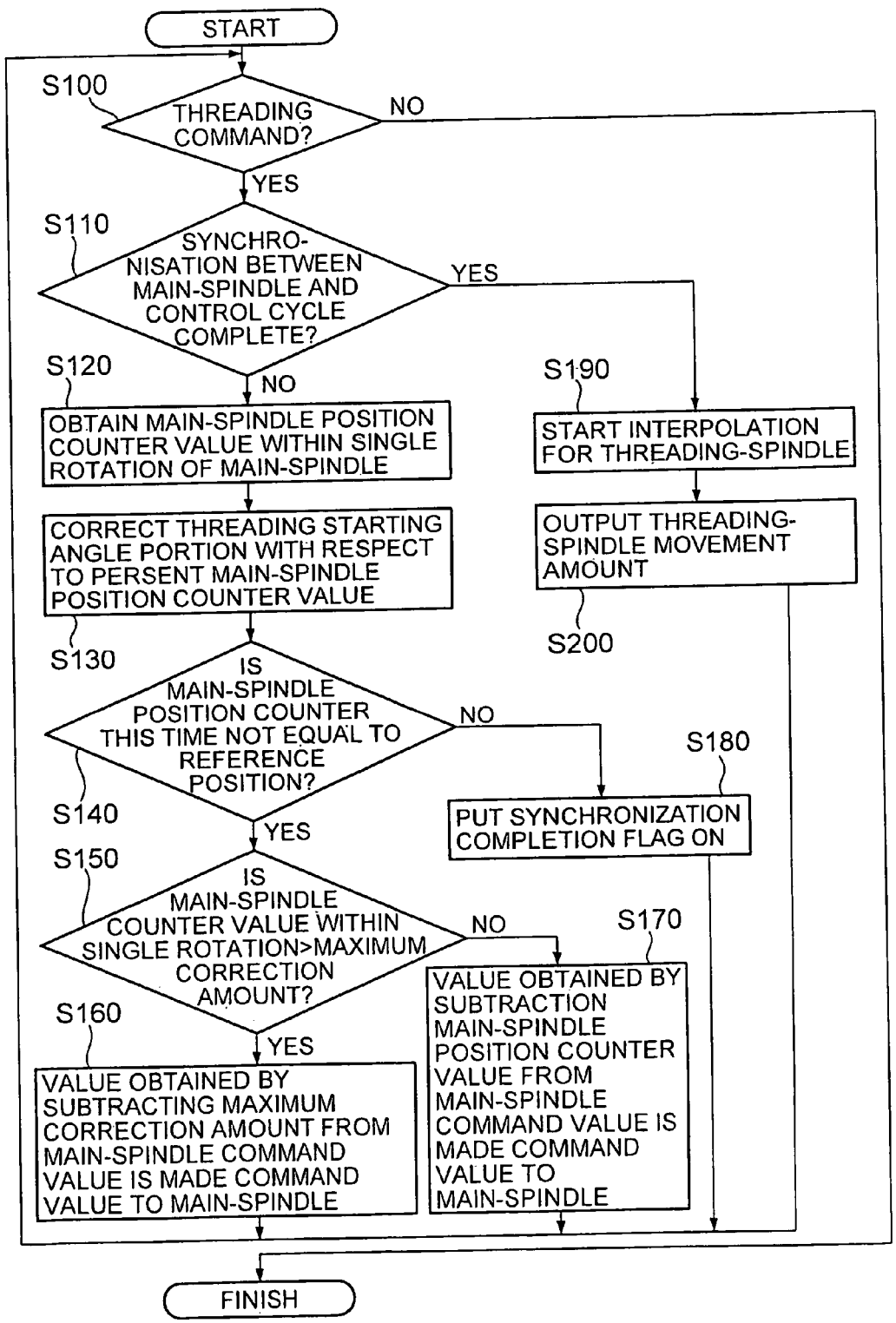
FIG. 5 is a flowchart illustrating processing steps for the threading control related to Embodiment 1 of the present invention.
Figure 6:
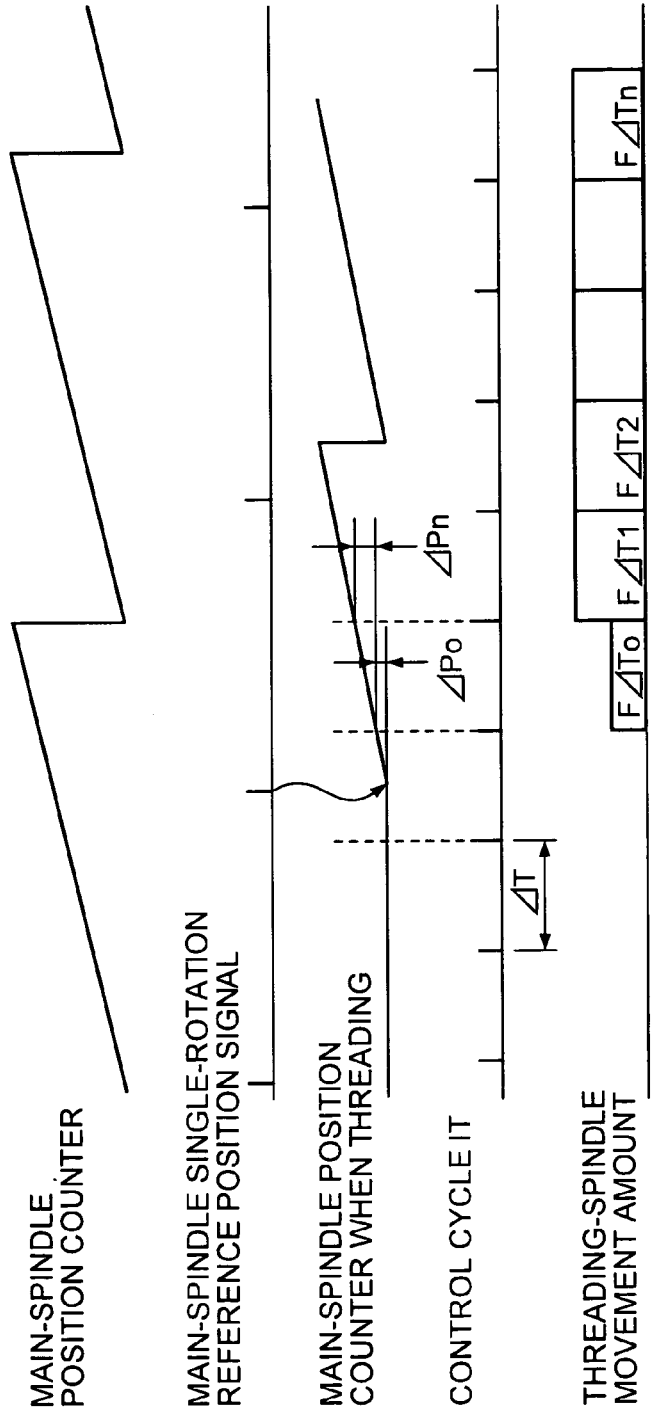
FIG. 6 is an explanatory diagram for conventional threading control.
Figure 7:
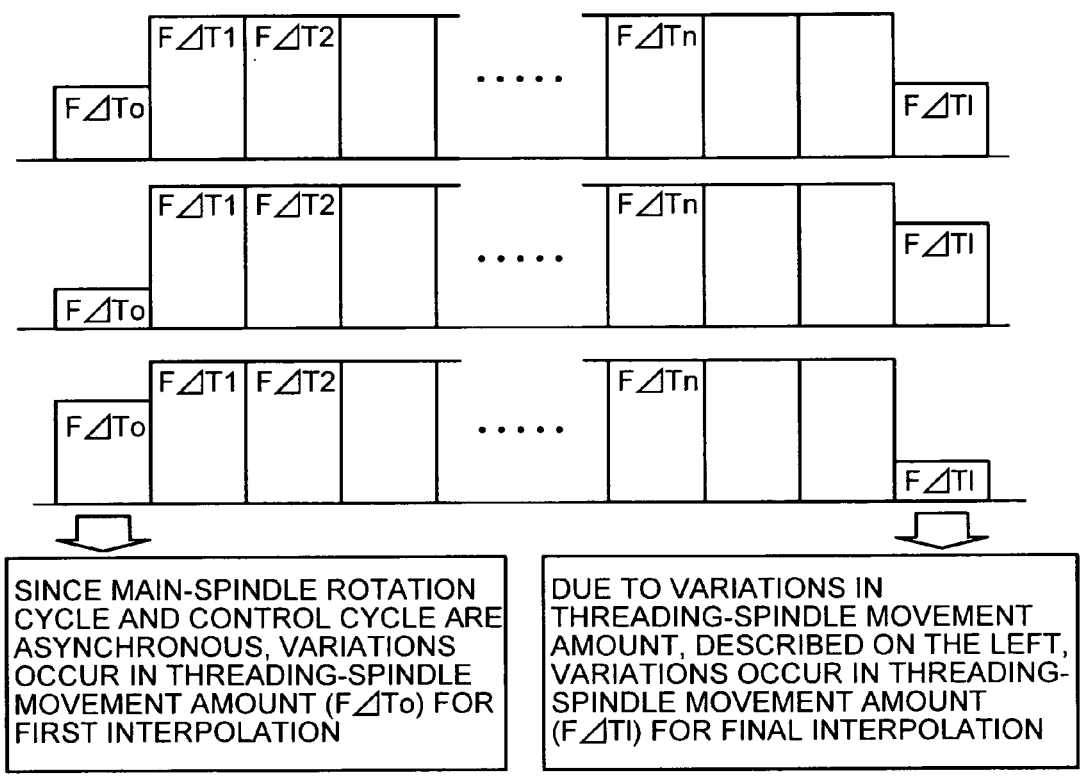
FIG. 7 is an explanatory diagram of examples of threading position variations with the conventional threading control.
Figure 8:
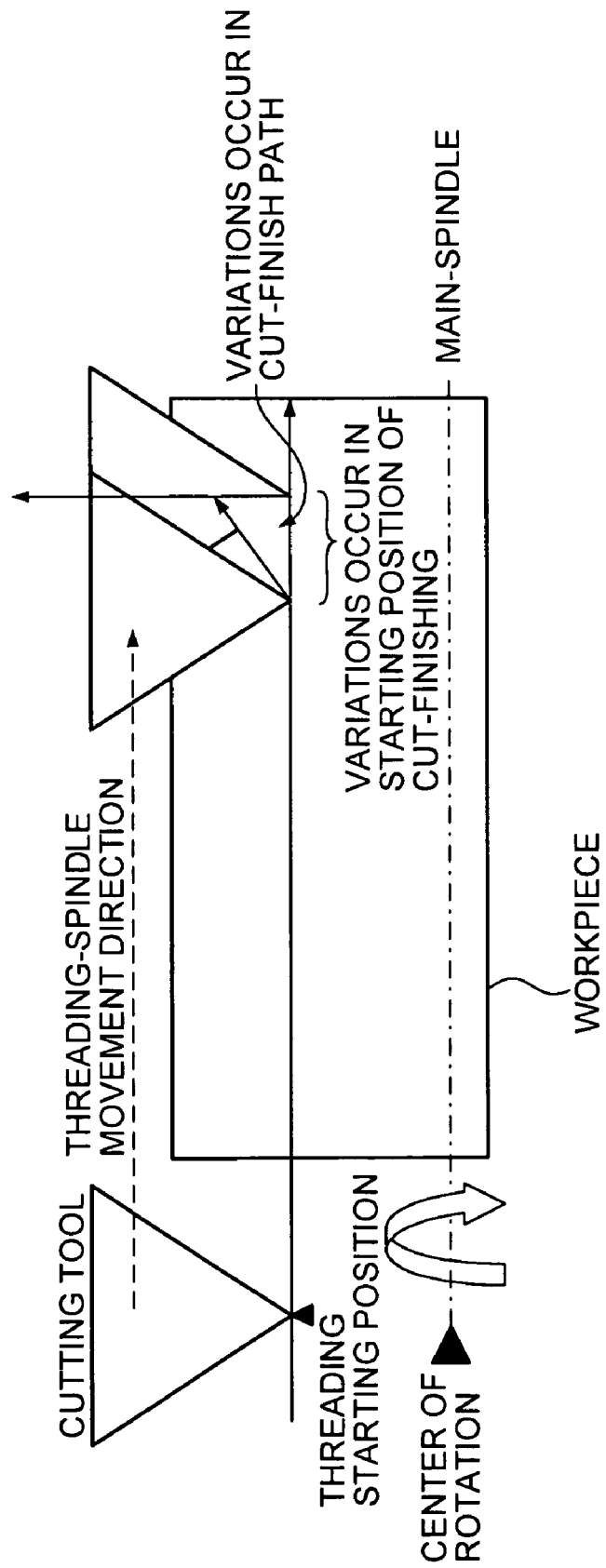
FIG. 8 is an explanatory diagram of a threading method.

Next, in Embodiment 1, after the main-spindle rotation cycle and the control cycles are synchronized and it is confirmed that the reference position signal and the control cycles are in conformance, the processing steps in generating the movement amount for the threading spindle are explained, referring mainly to the flowchart illustrated in FIG. 5.

In the interpolation processing unit 102 where processing is repeatedly carried out every fixed cycle (for example, every 10 msec), based on information from each single block in the machining program 110, output by the program analysis means 101, a judgment is made as to whether the present command is the threading command (step S100), and in cases where it is not the threading command, processing is finished at that point.

In cases where the present command is the threading command, reference is made to a synchronization completion flag 107 representing whether the main-spindle rotation cycle and the control cycle, illustrated in FIG. 1, are in synchronization (step S110). Here, in cases where the synchronization completion flag 107 is on, that is, the main-spindle rotation cycle and the control cycle are in synchronization, the interpolation for the threading spindle is started and the threading-spindle movement amount is obtained (Step S190).

$$F\Delta Tz=(\Delta Pz \div P) \times L$$

(ΔPz: first-time main-spindle position variation amount [number of pulses], P: number of pulses for a single rotation of the main spindle, L: thread lead The obtained movement amount FΔTz of the threading spindle is output as the command value (Step S200).

Figure 4:
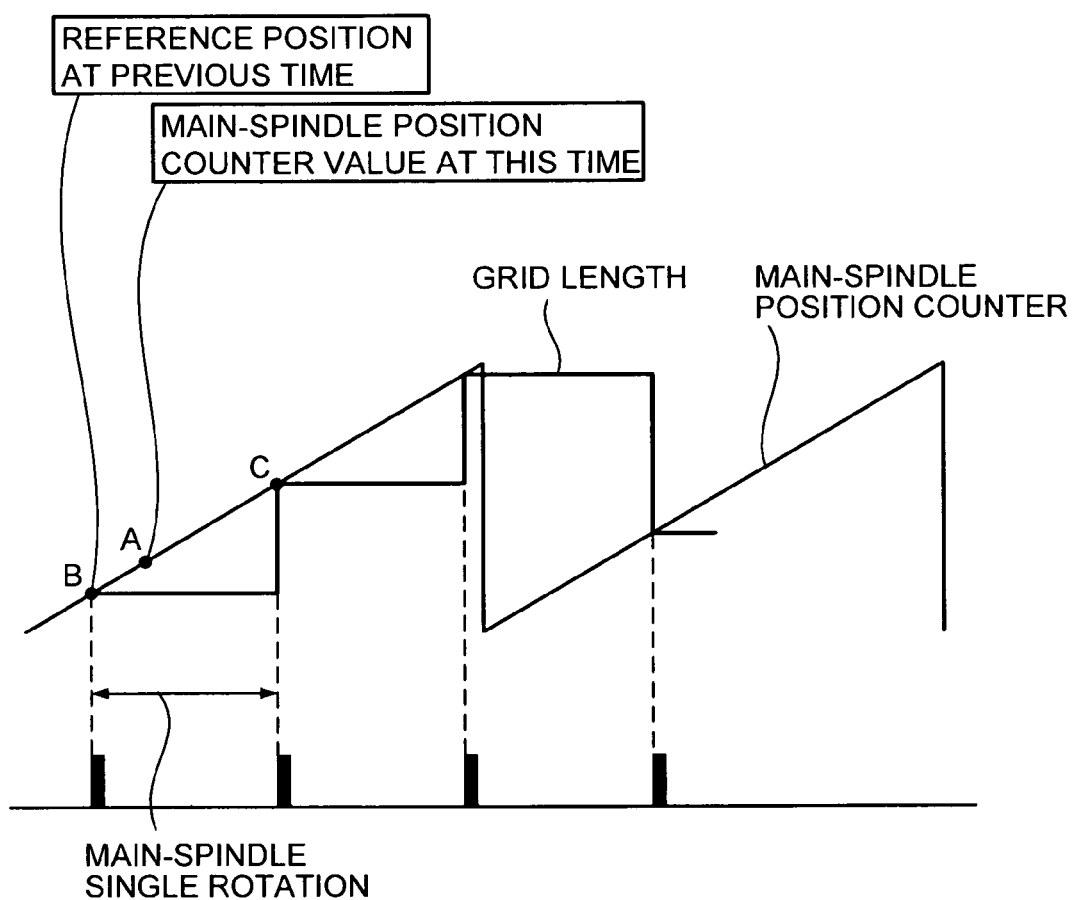
FIG. 4 is an explanatory diagram for processing of the threading control related to Embodiment 1 of the present invention.

In cases where the synchronization completion flag 107 is off, that is, the main-spindle rotation cycle and the control cycle are asynchronous, in order to obtain the point A, being the present main-spindle position, illustrated in FIG. 4, (the interpolation starting signal for the main spindle is monitored for the position where it coincides with this main-spindle interpolation starting signal), as the clamping value within one main-spindle rotation, and make a correction, computation is carried out as: the present main-spindle position counter value (point A) minus the previous reference position (point B: grid length). (Step S120).

The value obtained from this computed result is the deviation amount between the main-spindle single-rotation reference position and the control cycle IT (=the correction amount 108).

The threading starting angle 114 illustrated in FIG. 1 is added to the previously obtained value of the point A clamped within a main-spindle single-rotation (Step S130), and a comparison is made (Step S140) with the main-spindle single-rotation reference position, point C (as will be described below, this should be a position in conformance with the control cycle IT, after a controlled slowing of the speed of the main-spindle rotation in accordance with the correction amount 108.) Here, in cases where the compared result is one of conformance, the synchronization completion flag 107 is made ON (Step S180).

In cases where the threading starting angle 114 command is issued as an angle, this angle is added after it is converted to a counter value. Further, in cases where it is not necessary to shift the threading starting position, Step S130 is not necessary.

In Step S140, since before starting the threading-spindle interpolation, the main-spindle single-rotation reference signal and the control cycle are generally not in synchronization, the procedure normally moves to Step S150.

Next, in cases where the comparison result is different, the previously obtained present main-spindle position counter value, clamped within the main-spindle single rotation (=the correction amount 108) (point A) is compared with the main-spindle maximum correction amount 112 (Step S150); in cases where this present main-spindle position counter value is less than the main-spindle maximum correction amount 112, the main-spindle position counter value is subtracted from the main-spindle movement amount FΔTs per control cycle unit, obtained from the main-spindle command rotation number, as illustrated in FIG. 2, and this subtraction result is made the main-spindle movement amount FΔTsc per control cycle unit (Step S170), and the speed of the main spindle is decreased. In cases where the present main-spindle position counter value, clamped within the main-spindle single rotation is larger than the main-spindle maximum correction amount 112 of FIG. 1, the main-spindle maximum correction amount 112 is subtracted from the main-spindle movement amount FΔTs per control cycle unit, and this subtraction result is made the main-spindle movement amount FΔTsc per control cycle unit (Step S160), and the speed of the main spindle is decreased. Regarding the portion of the correction not effected in Step S160, processing of Steps S100–S160 is repeated, and finally processing moves to Step S170, so that the rotation cycle of the main spindle and the control cycle are in conformance.

In this way, in Embodiment 1, based on the present main-spindle position counter value and the main-spindle single-rotation reference position, the speed of the main spindle is decreased and the position of the main spindle is corrected, so that it is possible to make the control cycle be in conformance with the main-spindle rotation cycle, and in this way, the threading spindle movement amount, when threading is started, can be made to be always constant.

Embodiment 2

In Embodiment 1 described above, the position of the main spindle was corrected in the direction in which the main-spindle rotation decreases; however, in cases where the present main-spindle position counter value (point A) is closer to the counter-rotation direction than the reference position, and the difference between the present main-spindle position counter value (point A) and the reference position, that is, the correction value, R, which is equal to the pulse value for one main-spindle rotation minus the position counter value of a single rotation, is within an increase-range upper-limiting value 113 for the main-spindle rotation, illustrated in FIG. 1 (a value at which, even with the correction value R added to the main-spindle movement amount FΔTs, speed variation is not large and the main-spindle alarm does not occur), and even with the correction amount R added to the main-spindle movement amount FΔTs, a given main-spindle rotational frequency is not exceeded, and taking the main-spindle movement amount FΔTs per control cycle unit, to which the correction value R is added, as the main-spindle movement amount FΔTsc per control cycle unit, by increasing the main-spindle speed, the main-spindle rotation cycle may be made to be in conformance with the control cycle.

INDUSTRIAL APPLICABILITY

The threading control method and apparatus therefor, related to the present invention as described above is suitable for use as a threading control method and apparatus therefor in cases where machining is repeated two or more times for the same thread.

The invention claimed is:

1. A threading control method for moving a cutting tool and a workpiece in synchronicity with rotation of a main spindle to machine thread grooves in the workpiece, the threading control method comprising:
    computing the present position of the main spindle;
    generating a correction amount of the main-spindle position in order to make a single-rotation reference signal of the main spindle synchronous with a control cycle, based on the single-rotation reference signal of the main spindle and the computed present position of the main spindle, and correcting, by this correction amount of the main-spindle position, the position of the main spindle so that the single-rotation reference signal of the main spindle and the control cycle are synchronized;
    confirming the synchronization of the control cycle and the cycle of the single-rotation reference signal of the main spindle whose position has been corrected; and
    outputting a command to a threading spindle when the main-spindle single-rotation reference signal and the control cycle are synchronized.

2. The threading control method according to claim 1, wherein the main-spindle position is corrected in a direction in which the main-spindle rotational frequency decreases.

3. The threading control method according to claim 1, wherein when the deviation between the main-spindle single-rotation reference signal and the control cycle are below a prescribed value, and the rotational frequency of the main spindle is below a designated value, then the position of the main spindle is corrected in a direction in which the rotational frequency of the main spindle increases.

4. The threading control method according to claim 2, wherein the correction amount of the main-spindle position is computed to be below a main-spindle maximum correction, in order that variations in the main-spindle rotation be within a prescribed variation range.

5. The threading control method according to claim 1, wherein the correction amount of the main-spindle position includes a threading start angle.

6. A threading control apparatus for moving a cutting tool and a workpiece in synchronicity with rotation of a main spindle to machine thread grooves in the workpiece, the threading control apparatus comprising
    a main-spindle position computing means configured to compute the present position of the main spindle;
    a main-spindle position correcting means configured to generate a correction amount of the main-spindle position in order to make a single-rotation reference signal of the main spindle synchronous with a control cycle, based on the single-rotation reference signal of the main spindle and the present main-spindle position computed by the main-spindle position computing means, and configured to correct, by this correction amount of the main-spindle position, the position of the main spindle so that the single-rotation reference signal of the main spindle and the control cycle are synchronized;
    a threading-spindle interpolation starting detection means configured to confirm the synchronization of the control cycle and the cycle of the single-rotation reference signal of the main spindle whose position has been corrected; and
    an interpolation means for each spindle configured to output a command to the threading spindle when the main-spindle single-rotation reference signal and the control cycle are synchronized.

7. The threading control apparatus according to claim 6, wherein the main-spindle position correcting means corrects the main-spindle position in a direction in which the rotational frequency of the main spindle decreases.

8. The threading control apparatus according to claim 6, wherein when the deviation between the main-spindle single-rotation reference signal and the control cycle and the main spindle is below a prescribed value, and the rotational frequency of the main spindle is below a designated value, then the main-spindle position correcting means corrects the main spindle position in a direction in which the rotational frequency of the main spindle increases.

9. The threading control apparatus according to claim 6, wherein the main-spindle position correcting means computes the correction amount of the main-spindle position to be below a maximum correction, in order that variations in the main-spindle rotation be within a prescribed variation range.

10. The threading control apparatus according to claim 6, wherein the correction amount of the main-spindle position computed by the main-spindle position correcting means includes a threading start angle.

* * * * *